Aug. 15, 1950     D. E. LEONARD     2,518,799
DEMOUNTABLE BRUSHING MACHINE
Filed Jan. 6, 1947     4 Sheets-Sheet 1
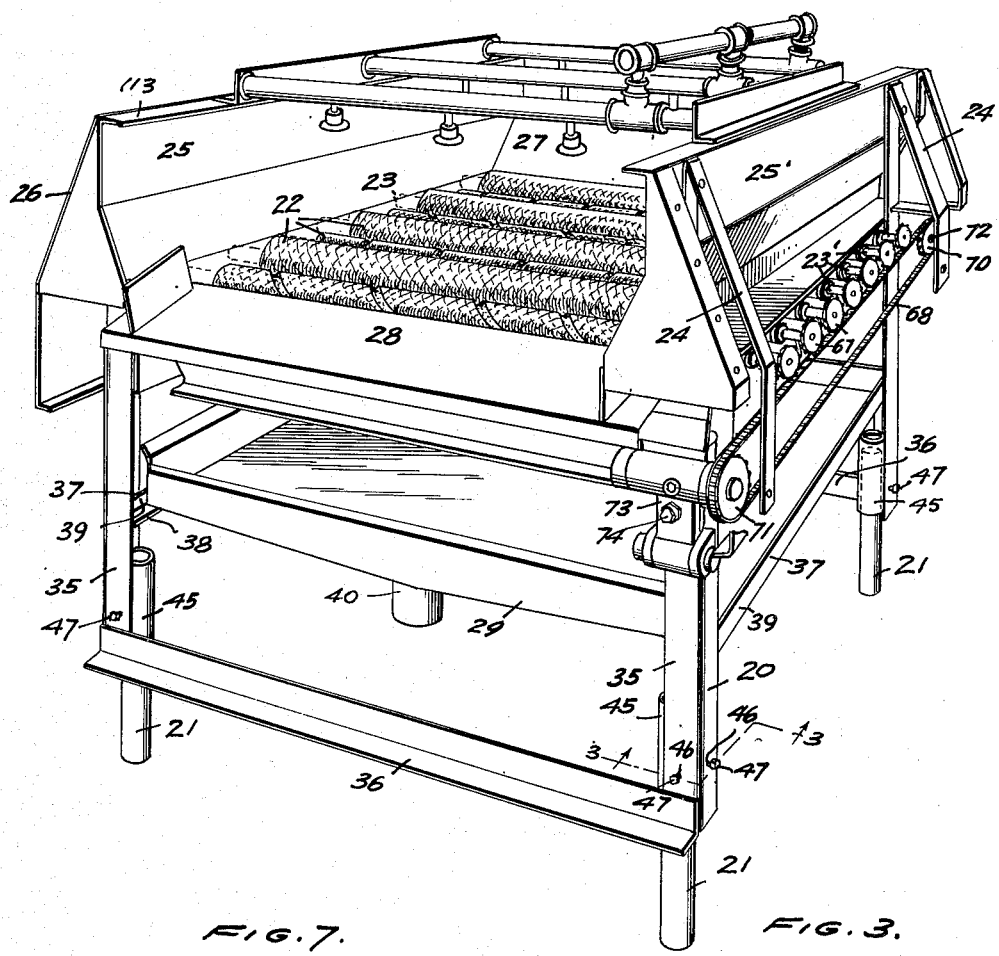
INVENTOR.
DAVID E. LEONARD

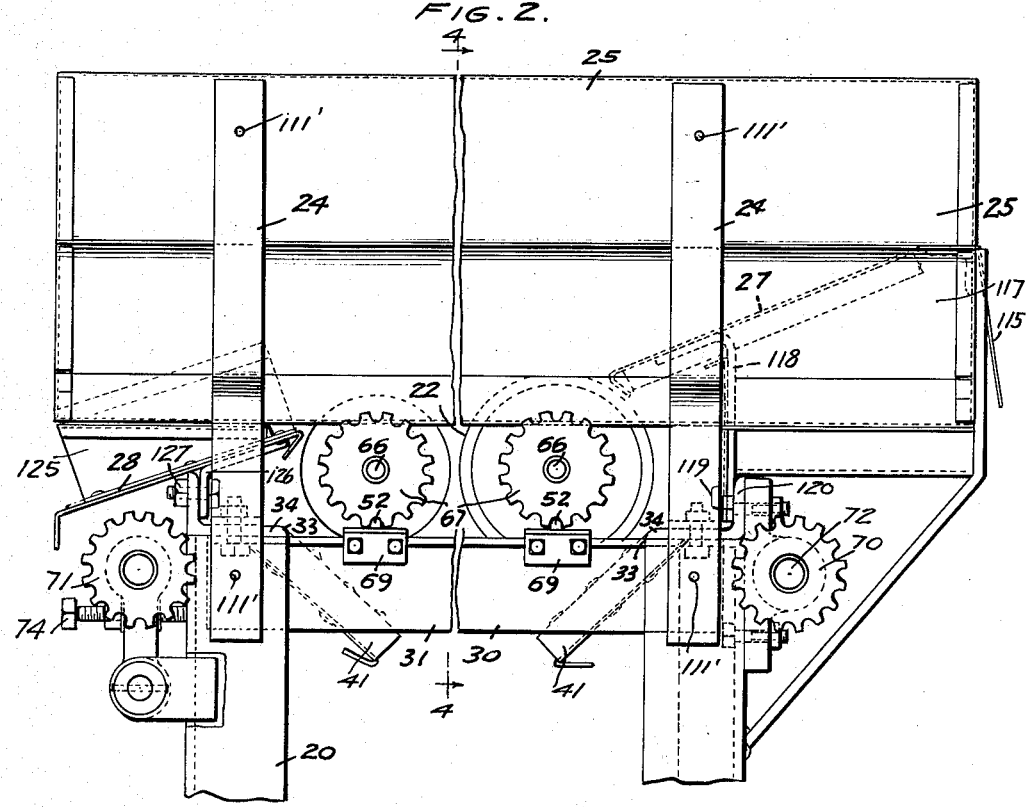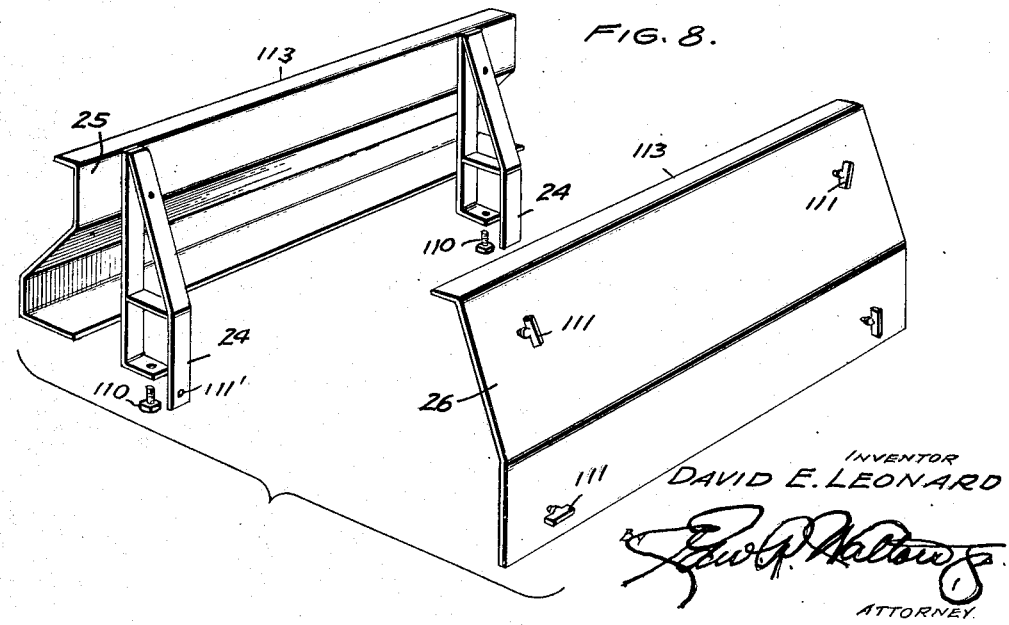

Aug. 15, 1950 D. E. LEONARD 2,518,799
DEMOUNTABLE BRUSHING MACHINE
Filed Jan. 6, 1947 4 Sheets-Sheet 4
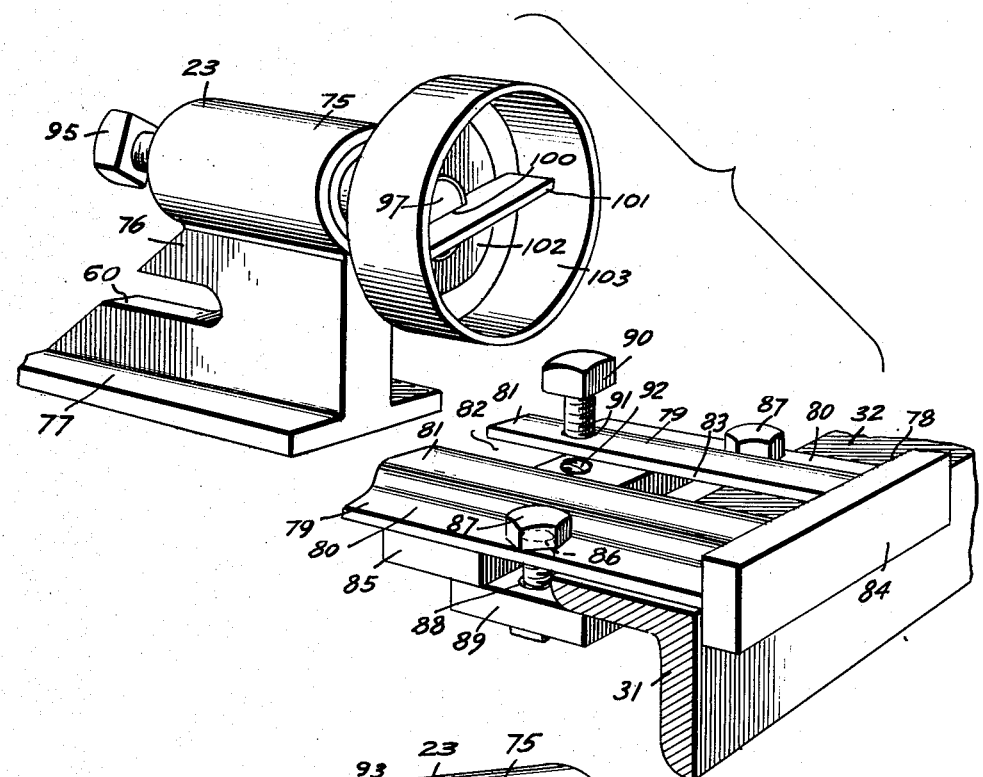
FIG. 5.
FIG. 6.
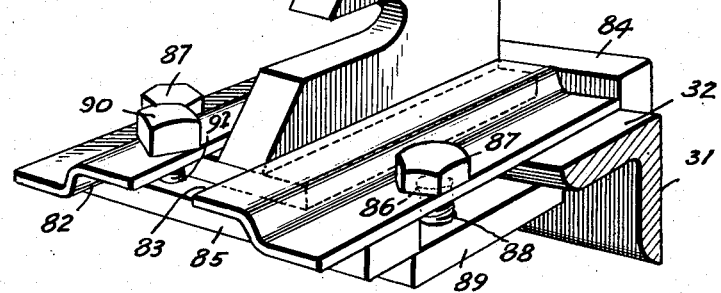
INVENTOR
DAVID E. LEONARD
BY
ATTORNEY Patented Aug. 15, 1950

2,518,799

UNITED STATES PATENT OFFICE 2,518,799

DEMOUNTABLE BRUSHING MACHINE

David E. Leonard, Orlando, Fla., assignor to American Machinery Corporation, Orlando, Fla., a corporation of Florida Application January 6, 1947, Serial No. 720,361

4 Claims. (Cl. 308—59)

This invention relates to machinery for processing produce, such as fruits and vegetables, and, more particularly, to that type of machine that comprises a treating bed composed of a plurality of rotatable elements, such as brushes, and may be employed as a washer, buffer or the like.

The machines employed in the processing of fruits and vegetables are usually rather rough and heavy in construction and cumbersome to handle. It has been thought that these machines must necessarily be formed of heavy materials and rigidly assembled to withstand the wear and tear of their operation. The machines are normally installed in very rough buildings or out-of-doors and are subject to considerable deterioration, not only from the elements but also from the liquids employed in processing the produce and from the dirt and trash that is passed into the machine by and with the produce. In view of the type of construction heretofore employed, the machines have been very difficult to repair and it has been practically impossible to adjust or move the machines once they were installed.

Having in mind the defects of the prior art apparatus, it is an object of this invention to provide a produce-processing machine that is relatively lightweight in construction but, nevertheless, is sufficiently sturdy to withstand the rough usage to which it is put. In addition, it is desired to provide a machine which may be readily assembled and disassembled in order to facilitate movement from one place to another and also to effect quick and easy repairs. Furthermore, it is an object to provide an assembly comprising adjustable parts that may be readily adjusted or regulated to effect improvement in operation by adjusting the level or angle of the machine and the like. Moreover, it is an object to provide an arrangement that will effect rapid mounting and dismounting of the bed-forming rollerlike members to permit their ready replacement. It is contemplated that the machine will comprise a unique construction that permits an economy of materials and parts and yet provides superior operating results.

The foregoing objects and others, ancillary thereto, are preferably accomplished, in accordance with a preferred embodiment of the invention, by providing a machine that comprises a lightweight, but sturdy, supporting framework formed of angle irons and then removably mounting all of the other parts of the machine upon the supporting frame. In addition, unique constructions are contemplated of the parts of the machine to permit ready attachment to, or removal from, the supporting frame, particularly with respect to removable and adjustable mountings for the bed-forming rotatable members.

Specifically, the support is composed of angle irons which are rigidly secured together to form a boxlike, rectangular frame which has braces along its sides, said braces being secured to the inner sides of its vertical members and being tilted slightly in order to support a drip pan at a slight angle so that drainage will be effected to one end of the pan. Short, tubular members, such as pieces of pipe, are secured within the angles of the vertical angle irons of the frame to form sleeves for adjustably receiving feet forming pieces of pipe or rod. Apertures are bored through the flanges of the vertical members and the walls of the sleeves affixed thereto to receive set screws for clamping the feet forming pipes or rods in the desired positions to facilitate the leveling of the machine regardless of any unevenness of the surface on which it is mounted and also to permit the tilting of the machine in order to regulate the treatment of the produce.

A series of pairs of sleeves are removably clamped along the opposed side members of the top horizontal frame to form bearing blocks for receiving arbors that have sockets on their inner ends which are adapted to removably receive the mating ends of the rotatable bed-forming members. On one side of the frame, the arbors and their sleeve bearings are fixed against axial movement and the arbors are provided at their outer ends with sprockets which mesh with a driven chain. On the other side of the frame, plugs are secured in the sleeves and axially extending threaded members are threaded in apertures in the plugs so as to adjustably bear against the outer ends of their respective arbors. These sleeves are mounted for axial movement in a slideway and they are locked in their forward, or normal, positions by pins inserted through apertures in the bottom of each slideway.

These bearing blocks are enclosed within removable inner splash guards and outer side guards so that they are readily accessible. The splash guards are affixed to frame members which are removably secured to the support frame, and the side guards are removably secured to the frame members. This structure permits the removal of the side guards to gain access to the bearing blocks and drive mechanism, or of the whole splash and side guard assembly from the support frame. In addition, both the loading and unloading trays, which are positioned between the splash guards and at opposite ends of the frame, are formed and adapted for removable attachment on the support frame.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout, and in which:

Fig. 1 is a view in perspective of a produce treating machine incorporating the present invention;

Fig. 2 is a side view in elevation of the machine shown in Fig. 1, but with the adjacent side cover removed;

Fig. 3 is a cross-sectional view taken on line 3—3 of Fig. 1;

Fig. 5 is an exploded view in perspective, from one end, of an adjustable bearing block;

Fig. 6 is an exploded view in perspective, from the other end, of an adjustable bearing block;

Fig. 7 is a fragmentary side view in elevation of a demountable roller mounting; and Fig. 8 is an exploded view in perspective of the splash and side guard assembly.

Figure 4:
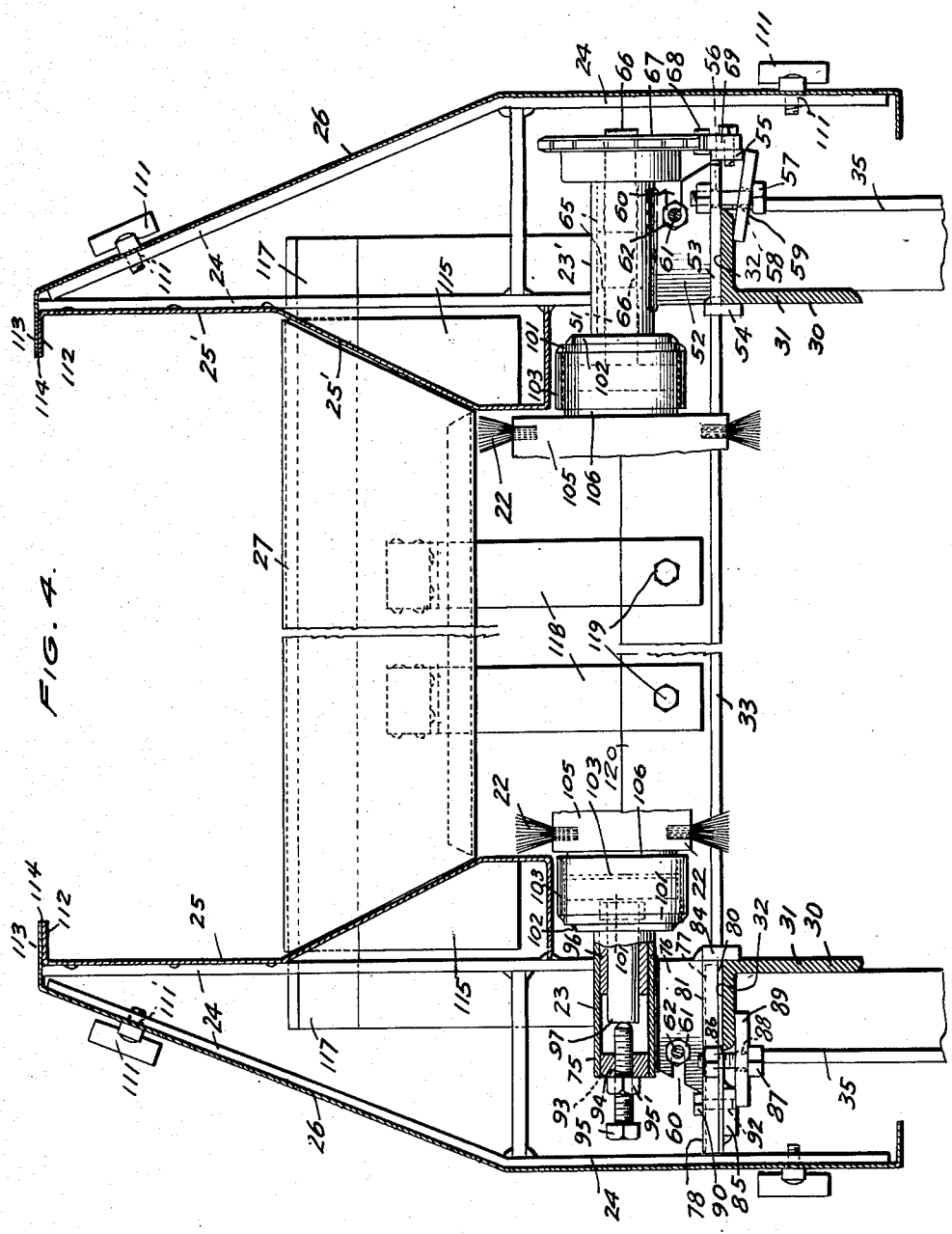
Fig. 4 is a cross-sectional view taken on line 4—4 of Fig. 2.

A produce treating machine to overcome the defects hereinbefore enumerated should have the totally distinct characteristic of being relatively small and lightweight and of being demountably and adjustably assembled. Accordingly, a preferred embodiment of the invention, referring to Fig. 1, is constituted by a machine comprising a supporting framework 20 that is adjustably mounted upon feet 21 and upon which is removably mounted bearing members 23 and 23' that support a plurality of rollers 22 which form a conveyor treating bed, frames 24 which support splash guards 25 with end panels 25' and have covers 26 removably mounted thereon, a loading tray 27 for feeding produce to the conveyor treating bed, an unloading tray 28 for directing produce from the treating bed conveyor, and a drip pan 29 mounted beneath the treating bed conveyor rollers 22 and to collect treating fluid sprayed thereover.

The supporting frame 20 comprises a horizontally-positioned, rectangular top frame 30 which is formed of angle irons and is composed of side members 31 and end members 33. As best shown in Fig. 2, the side members 31 are positioned with their horizontal flanges 32 extending outwardly along their upper edges and the end members 33 are positioned with their horizontal flanges 34 extending inwardly at their lower edges and in contact with the flanges 32 of the side members 31. Vertical angle members 35 are secured at their upper ends to each corner of the frame 30 and with their angle openings facing inwardly. The framework 20 is braced across its end by angle members 36 which are secured on the outer faces of the vertical members 35, and along its sides by angle members 37 which are secured to the inner faces of the side flanges of the vertical members 35 and with their horizontal flanges 38 extending inwardly and preferably from their bottom edges.

It will be seen that the above described structure provides a rigid and strong supporting frame, but which is, nevertheless, comparatively lightweight. Furthermore, an economy of structure is realized by the preferred arrangement of the side braces 37 as they may be employed for dual purposes, for bracing and for supporting the drip pan 29 which may be removably mounted on the flanges 38 and retained against lateral movement by the upstanding flanges 39. The angle braces 37 are preferably secured to the upright members 35 in a plane that is tilted downwardly toward the unloading or discharge end and, consequently, support the drip pan 29 at an angle so as to cause liquids to drain toward a discharge nozzle 40. Drain trays 41, are secured at the inner sides of each end of the horizontal frame 30 and at an angle directed inwardly so as to drain any liquids to the drip pan 40.

A sleeve 45 is nested and secured within the lower portions of each of the angle members 35. These sleeve members 45 may be formed of short sections of pipe and need not be highly finished. Threaded apertures 46 are bored through each of the flanges of the upright members 35 and through the adjacent portions of the pipes 45. Set screws 47 are threaded in the apertures 46 to adjustably clamp foot members 21 within the pipe sleeves 45, as shown in Fig. 3. The foot members 21 may be formed from standard pipe or rod stock that is of a diameter that will permit its telescoping within the sleeve pipes 45. This structure permits the adjustable positioning of the feet 21 within the pipes 45 so as to vary the length of each leg of the frame. The feet 21 may be adjusted to accommodate an uneven floor or the like, or to position the bed of rollers 22 to any desired angle relative to the floor. In the latter case, the bed may be positioned horizontally or tilted to an angle so as to affect the resistance and speed of produce travel there across and thereby regulate the degree of treatment of the produce.

The side angle members 31 of the upper frame 30 support the rollers 22 which form the treating bed. The rollers 22 should be adjustably mounted to permit their being properly spaced relative to each other and they should also be removably mounted to permit their removal and replacement as they become worn. This latter condition is not so essential if the roller members are composed of solid rolls, but frequently they are in the form of cylindrical brushes and the bristles of the brushes deteriorate very rapidly, particularly when subject to wetting by various produce-treating liquids, or become clogged, particularly when subject to waxlike preservative emulsions. Consequently, it is preferable to removably mount the ends of the roller members on adjustably-positioned arbors, at least one of which is adapted for axial movement to permit the insertion and removal of the roller members. Accordingly, the present invention provides a simple and economical, but highly efficient roller mounting assembly that permits their ready adjustment or replacement.

On one side of the frame 30, as shown in Fig. 4, each of the bearing members 23' is composed of a sleeve member 51 supported by an inverted T-shaped member 52, the cross flange 53 of which forms a base for resting directly upon the horizontal flange 32 of the side member 31. A short bar 54 is secured to the inner end of the inverted T support 52 and with its lower edge extending below the bottom of the cross flange 53 so as to form a stop for abutting the inner side of the angle bar 31. A similar bar 55 is secured across the opposite or rear end of the T support 52 and also extends below the cross flange 53. Apertures 56 are formed in each side of the cross flange 53 and spaced from the stop bar 54 a distance slightly greater than the width of the supporting frame flange 32. Bolts 57 are seated in the apertures 56 and extend through apertures 58 in a clamp plate 59 which spans the distance between the frame flange 32 and the rear bar 55 so that upon tightening the bolts 57 the cross flanges 53 will be clamped securely to the supporting frame flange 32. The rear edge of the upright web portion of the inverted T support 32 has a slot 60 cut therein to receive the usual threaded spacing bar 61, the support 52 being positioned relative to the bar by pairs of nuts 62 which are positioned on opposite sides of the web portion of the support 32.

As a matter of simplicity and economy of construction, the sleeve members 51 may be composed by sections of ordinary pipe and they may be assembed with pieces of T iron, cut to shape to form the supports 52, as by welding, soldering or the like. In order to adapt the pipe sleeves 51 as bearings, one or more sleeve bearings 65 may be inserted in the pipes 51 to form journals for spindles 66 which are adapted to rotatably support one end of the rollers 22 on their inner ends. The spindles 66 have driven sprockets 67 secured to their outer ends. Thus, it will be seen that the spindles 66 are driven in order to rotate the rollers 22 and are supported by their bearing blocks 23' for adjustment longitudinally of the supporting frame flange 32, so as to position the rollers 22 relative to each other, but are not adapted for axial movement.

The spindle sprockets 67 are driven by a chain 68 that is supported beneath, and retained in mesh with, the sprockets 67 by shoes 69 which may be secured to the rear bars 55 of the bearing blocks 23'. The chain 68 is supported by a pair of sprockets 70 or 71, one on each end of the machine. The sprocket 70 is mounted on a shaft 72 that may be driven in suitable manner, whereas, the sprocket 71 is pivotally mounted on an arm 73 that is pivoted at one end to the framework 20. The chain 68 tends to swing the sprocket 71 and arm 73 toward the frame 20 but they may be spaced therefrom, and to take up slack in the chain 68, by a bolt 74 threaded through the arm 73 and bearing against the frame 20.

On the other side of the frame 30, each of the bearing members 23 is composed of a sleeve 75 mounted upon an inverted T support 76 having cross flanges 77, and is substantially identical to the sleeves 51 and their supports 52. The upright web portions of the supports 76 are likewise provided with slots 60 extending inwardly from their rear edges to receive a threaded spacing bar 61 and to be positioned by pairs of nuts 62. In other respects, however, the bearing block 23 differs from the bearing block 23' in that it is adapted for axial movement as well as longitudinal movement. Each inverted T support 76, instead of being clamped directly to the frame flange 32, has its cross flanges 77 slidably mounted in a positioning plate 78 that is clamped to the supporting frame flange 32. As best shown in Figs. 4, 5, and 6, the positioning plate 78 is composed of a pair of double angle strips 79 that have oppositely extending, parallel flanges 80 and 81 which are positioned to form an inverted channel 82, and said parallel flanges are spaced apart to form a slot 83 centrally of the channel 82.

In other words, the strips 79 are positioned with their flanges 80 extending outwardly and arranged to lie flush against the frame flange 32, whereas their flanges 81 are offset upwardly to form the inverted channel 82 and they extend toward each other but are spaced apart to form the slot 83. The strips 79 are secured across their inner ends by a bar 84 whose upper edge extends across the channel 82 and whose lower edge extends below the flanges 80 to form a stop for abutting the inner edge of the side frames 31. A rear bar 85 is secured to the flanges 80 and beneath the strips 79 adjacent their outer ends. The flanges 80 are provided with apertures 86 for receiving bolts 87 that extend through apertures 88 of a clamp block 89 that spans the distance between the rear bar 85 and the frame flange 32, thus adjustably clamping the positioning plate 78 to the top frame 30.

The bearing block 23 is slidably positioned in the positioning plate 78 by sliding the cross flanges 77 of the inverted T support 76 into the channel 82 and beneath the flanges 81 and with the upstanding web portion of the support 76 extending upwardly through the slot 83. By this arrangement, the cross flanges 77 are supported by the frame flange 32 and the rear bar 85 and are retained in position by the overlying flanges 81. The front bar 84 of the positioning frame 78 extends upwardly a sufficient distance to at least partially block the front end of the channel 82, and is shown as lying flush with the top surfaces of the flanges 81, so as to form a stop to limit forward movement and define the working position of the bearing support 76. The support 76 should be capable of slidable movement rearwardly but may be latched in its forward operating position by a pin 90 adapted to be removably inserted through mating apertures 91 and 92 in one of the flanges 81 and the rear bar 85, respectively.

The sleeve 75 differs from the sleeve 51 in that its rear end is closed by a plug 93 that is provided with a centrally located, threaded aperture 94 for receiving an axially extending threaded bolt 95 or the like, which may be locked by a lock nut 95'. Like the sleeve 51, the sleeve 75 may be formed of a section of pipe and be adapted as a bearing by the insertion of a sleeve bearing 96 positioned within its inner end and which is adapted to journal a spindle 97 for supporting the adjacent end of a roller 22. The spindle 97 is freely journaled in the bearing 96 so that it is capable of axial movement which is limited at its inner end by engagement with the roller 22 and at its outer end by axial abutment with the inner end of the adjustable bolt 95 which is preferably rounded to form an anti-friction thrust bearing. Each of the spindles 66 and 97 is provided at its inner end with means for supporting the ends of the rollers 22. In addition, at least with respect to the driven spindles 66, the roller supporting means is capable of driving engagement therewith.

In the present instance, the identical structure is employed for all of the spindles 66 and 97 and upon the opposite ends of the rollers 22. As shown in Figs. 5 and 7, each of the spindles 66 or 97 is provided at its inner end with a transversely extending slot 100 for receiving a flat web or blade-like member 101. A washer 102 is fixed on the spindle adjacent the end of the slot 100 and in abutting relation with and secured as a brace to, the inner edge of the web 101. A collar 103 is telescoped over and secured, concentric with the spindle, to the opposite ends of the web 101. The collar 103 is arranged to extend beyond the free, diametrically extending edge of the web 101. The rollers 22 are provided with cores 105 that have arbors 106 extending axially from each end thereof and which are provided with transversely extending slots 107 in their outer ends. The arbors 106 are of a diameter to snugly telescope within the collars 103 and their diametrically extending slots 107 are of a dimension to snugly but freely receive the webs 101. Thus the collar 103 forms a support for the arbor 106 and the web 101 provides an end abutting and positive or driving engagement with the slot 107.

In view of the foregoing description it should be readily perceived that the rollers 22 may be easily mounted or dismounted relative to their journals. In the present instance, the rollers 22 are shown as cylindrical brushes but it is obvious that they may partake of other forms. Regardless of their utilitarian form, they may comprise cores 105 which may be provided with the aforementioned arbors 106 which extend axially from each end thereof. Presuming the rollers 22 and their bearing blocks 23 and 23′ as being initially assembled upon the supporting framework 20, each of the blocks 23′ will be mounted on one side of the top frame 30 with their cross flanges 53 resting on the frame flanges 32 and their inner bars 54 abutting the inner edges of the side members 31.

The bolts 57 may then be dropped through the apertures 56 of the cross flanges 53 and through the apertures 58 of the clamping block 59 which is positioned with its outer edge underlying the cross bar 55 and its inner edge bearing against the underside of the frame flange 32, whereupon the nuts may be threaded loosely upon the bolts 57. As each bearing block 23′ is mounted, the spacing rod 61 is mated with the slot 60 and the block is positioned by the nuts 62 after which the bolts 57 may be tightened to clamp the block in place. Each of the spindles 66 are journaled in the bearings 65 and have the sprockets 67 fixed on their outer ends. The driving chain 68 may then be engaged with the bottom of each sprocket 67 and supported by a shoe 69 that may be attached to the cross bar 55.

The bearing blocks 23 may then be mounted along the opposite side member 31 of the top frame 30 by mounting each positioning plate 78 on the frame flange 32 and with its cross bar 84 abutting the inner edge of the frame side member 31 after which the clamp bolts 87 may be inserted through the apertures 86 in the flanges 80 and the apertures 88 in the clamp block 89 and their nuts threaded thereon. The supporting member 76 is then positioned in the plate 78 by sliding its cross flanges 77 into the inverted channel 82 and with its web portion extending vertically through the slot 83. The thrust bolt 95 is threaded through the aperture 94 and axially within the sleeve 75, and a spindle 97 is inserted in the sleeve bearing 96. The block 23 is then assembled and ready for positioning a roller 22.

The block 23 is slid outwardly in its collar 78 to space its roller-positioning collar 103 from that of its opposed bearing block 23′ to permit the axial alignment therebetween of a roller 22 which may then be moved axially toward the block 23′ to insert its adjacent arbor 106 into the respective collar 103 and the slot 107 over the web or blade 101. The block 23 may then be slidingly advanced in its plate 78 so that its collar 103 surrounds the adjacent arbor 106 of the roller 22 and its web or blade 104 slides into the arbor slot 107. When the block 23 is advanced to the point that the front of its support 76 abuts the bar 84, the pin 90 may then be dropped through the apertures 91 and 92, in the flange 81 and rear bar 95 respectively, to lock the support 76 in forward working position. The thrust bolt 95 may be adjusted to effect or accommodate movement of the spindle 97 in an axial direction so that the opposed blades 101 are firmly seated against the ends of their adjacent arbor slots 107.

At any time during the mounting operation, the spacing rod 61 may be inserted in the slots 60 of the supports 76 and the blocks 23 adjusted longitudinally thereof, whereupon the bolts 87 may be tightened to clamp the blocks 89 and the slideways or positioning plates 78 on the flange 32. When it is desired to replace one of the rollers 22, the pin 90 may be withdrawn and the bearing block 23 slid outwardly until its collar 103 is withdrawn from the adjacent roller arbor 106 and the opposed arbor 106 may be withdrawn from its collar 103 on the opposed bearing 23′. A replacement roller 22 may be inserted and the block 23 slidably advanced in its slideway positioning plate 78 as previously described. As there may be some slight variation between the rollers 22, the thrust bolt 95 may be adjusted to accommodate any such variation.

The lateral limits of the treating bed, formed by the conveyor rollers 22, are defined by the splash guards 25 which are supported above the ends of the rollers 22 to enclose the bearing blocks 23 and 23′ from the inside. As best shown in Fig. 8, each of the splash guards 25 are fixed to two frames 24 which are removably mounted on the top supporting frame 30. The frames 24 are positioned adjacent the ends of the guards 25 so that each of them may be secured by a single bolt 110 which will be located at a corner of the top supporting frame 30 and will be readily accessible from the outside. The cover guards 26 are removably mounted on the outsides of the frames 24 to enclose the bearing blocks 23 and 23′ from the outside, and may be attached by wing screws 111, carried by the covers 26, threaded into apertures 111′ in the outer members of the frames 24. The area between the splash guards 25 and the cover guards 26 may be enclosed at the ends by panels 25′ having inturned edges which may be secured to the abutting ends of the splash guards 25, as shown in Fig. 1.

Thus by unthreading the wing screws 111 from their threaded apertures 111′ in the frames 24, the cover plates 26 may be removed to permit access to the bearing blocks 23 or 23′ for purposes of adjustment or to effect replacement of one of the rollers 22. On the other hand, in order to facilitate the placement of the rollers 22 or to effect substantial repairs, the whole cover structure, including the frames 24, the splash guards 25 with their end panels 25′, and the cover guards 26, may be removed as a unit by unthreading the single bolt 110 at each end of the structure. Both the splash guards 25 and the cover guards 26 are turned inwardly along their upper edges to form superimposed flanges 112 and 113 that create reinforced, horizontal ledges 114 for supporting a spray, waxing, sudsing or other desired device.

The loading tray 27 and the unloading tray 28 are also removably mounted to permit ease of shipment, assembly or disassembly and repair or replacement. The loading tray or chute 27 includes a downwardly extending flange 115 at its upper edge for fitting over the inwardly sloped walls of the splash guards 25 and a supporting superstructure 117 on the framework 20, if such is provided. The tray 27 is fixed on a supporting frame 118 that is adapted to be removably secured by bolts 119 to the upstanding flange 120 of the adjacent end member 33 of the top frame 30. The unloading tray or chute 28 is provided with upstanding wings 125 to define the sides of the tray and is fixed on supporting brackets 126 which may be attached by bolts 127 to the upstanding flange 128 of the adjacent end member 33 of the top frame 30. Thus it will be seen that the entire structure is adapted for ready assembly or disassembly and that the individual elements may be quickly and easily adjusted, repaired or replaced.

Although certain specific embodiments of the invention have been shown and described, it is obvious that many modifications thereof are possible. The invention, therefore, is not to be restricted except insofar as is necessitated by the prior art and by the spirit of the appended claims.

That which is claimed as new, is:

1. In a machine for treating produce, such as fruits and vegetables, a supporting frame having spaced side members, bearing blocks removably and adjustably mounted in opposed pairs on said side members and with their bearing axes extending transversely of said frame, the bearing blocks on one of said side members being capable only of adjustment longitudinally of their supporting side member and having spindles journalled therein that are fixed against axial movement, the bearing blocks on the other of said supporting side members each including a slideway, a lock and a bearing portion, said slideway being removably mounted on the supporting side member with its slide extending transversely of said frame and being capable only of longitudinal adjustment on said side member, said bearing portion being slidably mounted in the slide of said slideway and said lock being adapted to hold the bearing portion in working position in the slideway, said bearing portion having a spindle journaled therein and an adjustable thrust bearing for effecting axial adjustment of said spindle relative to its opposed spindle in the aforementioned paired bearing block, the spindles in both sets of said bearing blocks having devices on their inner ends for removably supporting the adjacent ends of a rotatable member whereby the bearing blocks may be relatively moved axially to effect the mounting or dismounting of the rotatable member between opposed pairs of the bearing blocks on both sides of said frame.

2. A mounting for a rotatable member, as cylindrical brushes, rollers and the like, comprising a pair of spaced and opposed bearing members for removably supporting and rotatively mounting a rotatable member, said bearing members each having journalled therein a spindle terminating in a collar at its inner end and having a blade-like element extending substantially diametrically of and within said collar and rotatable with said spindle, said collars being adapted to receive the adjacent ends of said rotatable member with said blade-like elements extending into the ends of said rotatable member to rotatively support said member, one of said bearing members being supported for slidable movement in an axial direction to accommodate the axial movement of said rotatable member for mounting and dismounting said rotatable member, a lock device for removably holding said movable bearing member in position to support said rotatable member, and means for rotating said rotatable member when it is supported by said bearing members.

3. A mounting for cylindrical rotatable members, as brushes, rollers and the like, comprising a pair of spaced and opposing bearing members mounted upon spaced supports and for removably supporting and rotatively mounting a rotatable member, said bearing members including tubular portions having sleeve bearings mounted on base portions attached to said spaced supports and adjustable longitudinally of the latter, spindles journaled in said sleeve bearings respectively and having mating elements on their opposing ends to cooperate with complemental mating elements at the respective ends of said rotatable member, said cooperating mating elements being adapted to slidably mate by movement in an axial direction, one of the bases of each pair of bearing members including a plate adjustably attachable and having a slideway therein in which said base slides to and fro relative to the other bearing member in an axial direction to accommodate the axial movement of said cooperating mating elements for mounting and dismounting said rotatable member, and means for rotating said rotatable member when it is supported by said bearing members.

4. A brushing machine comprising a pair of bearing members mounted on spaced supports, a spindle supported in one of said bearing members and having a socket at its inner end, means at its outer end for driving said spindle, the other of said bearing members being movable axially in a slideway and supporting a spindle having a socket at its inner end, a thrust bearing adjustably positioned on said latter bearing member to effect axial adjustment of the spindle supported thereby, a cylindrical brush including a core having extensions on its ends which are adapted to be seated in said spindle sockets, and a releasable locking means for positioning said slidable bearing member for holding the core extensions in their respective sockets.

DAVID E. LEONARD.

REFERENCES CITED

The following references are of record in the file of this patent:

UNITED STATES PATENTS

| Number | Name | Date |
|---|---|---|
| 829,218 | Kaylor | Aug. 21, 1906 |
| 1,630,983 | Southerland | May 31, 1927 |
| 2,031,099 | Diescher | Feb. 18, 1936 |
| 2,035,587 | Brandenburg | Mar. 31, 1936 |